Oct. 26, 1943.  F. HUBER  2,332,970
DRIVE MECHANISM FOR CRAWLER TRACTORS
Filed July 8, 1941
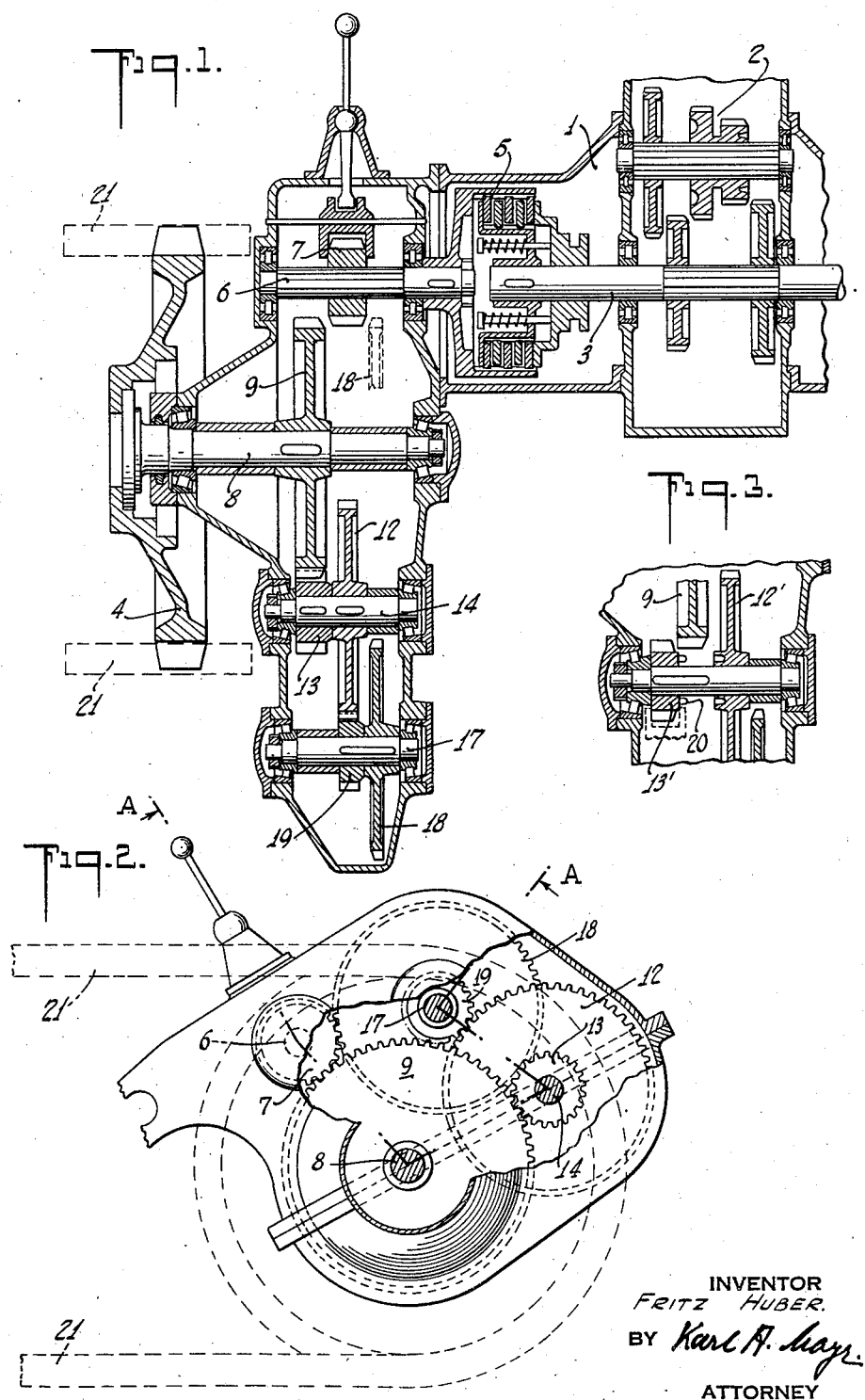
INVENTOR
FRITZ HUBER.
BY Karl A. Mays
ATTORNEY Patented Oct. 26, 1943

2,332,970

UNITED STATES PATENT OFFICE 2,332,970

DRIVE MECHANISM FOR CRAWLER TRACTORS

Fritz Huber, Mannheim, Germany; vested in the Alien Property Custodian

Application July 8, 1941, Serial No. 401,472
In Germany October 30, 1940

2 Claims. (Cl. 74—342)

The present invention relates to improvements in the drive mechanism of the chain tracks of crawler tractors particularly for road building having an equalizing gear arranged in series with the variable speed gear or two steering couplings and additional change-gears interposed between said couplings and the drive wheels for the chain-tracks or running belts; such mechanisms are characterized by the fact that the additional change gears are arranged partly on the shafts of the drive wheels and partly on the shafts of the additional reduction gears in such manner that the distances between the shafts of the drive wheels and the shafts of the steering couplings on the shaft of the equalizing gear remain unchanged. In mechanisms of the type set forth the wheels of the additional change gear which are arranged on the shafts of the drive wheels must be supported on hollow shafts or sockets which are disposed on the shafts of the drive pin wheels. If the steering coupling or clutch is suddenly engaged the bearing of the wheel rotating on the hollow shaft suffers a considerable shock which causes undesirable wear of the sensitive hollow shaft or of the bearing bushes.

It is an object of the present invention to avoid such undesirable hollow shafts or bushes by providing an improved arrangement of the additional change-gears. According to the invention the additional change gears are arranged on one or more gearing shafts which is or are interposed between the shafts of the clutches or couplings or of the equalizing gears and the shaft of the drive wheels of the chain tracks or belts or which is or are arranged in series with the shafts of the drive wheels. In this manner the shafts of the drive wheels are relieved of the additional change gears so that hollow shafts or bushes are unnecessary and can be replaced by bearings which can sustain heavy loads such as, for example, cone-roller bearings. According to the present invention the additional change gear is so arranged that the connecting pinion which is situated on a shaft of a steering clutch or the shaft of the equalizing gear can be made to mesh either with a reduction gear wheel connected with the shafts of the drive wheels for the chain tracks or with a double gear wheel connected to the first shaft of the reduction gearing which double gear wheel is in mesh with a further double gear wheel connected with the second gearing shaft the pinion of which engages the reduction gear wheel. The distances between the shafts of the drive wheels for the chain tracks and the shafts of the steering clutches of the shaft of the equalizing gearing may remain unchanged. Conventional elements may be therefore extensively used when an additional change gear is provided and the construction of the vehicle is not affected by the additional change gear.

According to the invention the additional change gears can be disconnected from the conventional drive mechanism so that the additional gears need not idle when the shafts of the drive wheels are directly driven. According to the invention the spur wheel arranged on the second shaft of the reducing gear is made disconnectable. For this purpose the pinion mounted on said second shaft is displaceably connected therewith and disconnectably connected with the spurwheel by means of a claw coupling. At direct drive from the shafts of the steering couplings or of the equalizing gearing to the shafts of the drive wheels for the chain tracks merely the pinion mounted on the second reduction gear shaft must be disconnected for setting the additional change gear at rest. In this manner the additional change gears are protected as much as possible and wear is considerably reduced.

Further and other objects of the present invention will be hereinafter set forth in the accompanying specification and claims and shown in the drawing which, by way of illustration, show what I now consider to be preferred embodiments of my invention.

In the drawing:

Fig. 1 is a sectional developed view of a schematic lay-out according to the present invention whereby line A—6—8—14—17—A of Fig. 2 is straightened out into a horizontal plane.

Fig. 2 is a diagrammatic side view of a mechanism according to the present invention.

Fig. 3 is a sectional view of a modified portion of the mechanism shown in Figs. 1 and 2.

Like parts are designated by like numerals in all figures of the drawing.

Referring more particularly to the drawing 1 designates part of the body of the vehicle containing conventional speed changing gears 2 for transmitting the rotation of the engine shaft at reduced speed to the gearing shaft 3. On each side of the vehicle an additional change gear is provided which may be coupled to shaft 3 by means of a steering clutch 5 and which is interposed between shaft 3 and drive wheels 4 of the chain tracks or belts 21. Each additional change gear consists of a speed change gear wheel 7 axially displaceably mounted on the secondary clutch shaft 6, a speed reducing gear wheel 9 connected with each shaft 8, and a double wheel 18, 19 keyed to first reduction gearing shaft 17, whereby wheel 7 can be displaced to be either in mesh with wheel 9 or with wheel 18 and one wheel of the double wheel 18, 19 meshes with one wheel of another double wheel 12, 13 keyed to reduction gearing shaft 14 and having a pinion 13 in mesh with wheel 9. Because of the interposition of the two change gears 17, 18, 19 and 12, 13, 14 a three fold speed reduction after shaft 6 is provided and drive wheels 6 are rotated at considerably reduced speed.

In order to prevent idling of the additional speed reducing gears when power is transmitted directly from shaft 6 to shaft 8 the additional change gears may be adapted to be uncoupled from the rest of the mechanism. For this purpose pinion 13' may be arranged axially displaceably on shaft 14 and connectable with wheel 12' by means of a claw coupling 20, as shown in Fig. 3.

While I believe the above described embodiments of my invention to be preferred embodiments, I wish it to be understood that I do not desire to be limited to the exact details of design and construction shown and described, for obvious modifications will occur to a person skilled in the art.

I claim:

1. In a drive mechanism, the combination with a driving shaft of a pinion slidable on said shaft; a driven shaft; a gear wheel fast on said driven shaft; a countershaft; a gear wheel fixed on said countershaft, the pinion and the two gear wheels being so disposed that the pinion may be engaged with the gear wheels, alternatively; a pinion fixed on said countershaft; a second countershaft; a gear wheel fixed on said second countershaft and meshing with the pinion on said first countershaft; and a pinion fixed on said second countershaft and meshing with the gear wheel on the driven shaft.

2. In a drive transmission, the combination of a casing; a driving shaft; a driven shaft; a countershaft; a second countershaft; a pinion slidably mounted on said driving shaft; a gear wheel fixed on said driven shaft; a gear wheel and a pinion, each fixed on said first mentioned countershaft; and a gear wheel and a pinion, each fixed on said second mentioned countershaft, the four shafts being so journaled in said casing that the pinion on the driving shaft is adapted to mesh with the gear wheel on the driven shaft and the gear wheel on the first mentioned countershaft, alternatively, the pinion on the first mentioned countershaft is constantly in mesh with the gear wheel on the second mentioned countershaft, the pinion on the second mentioned countershaft is constantly in mesh with the gear wheel on the driven shaft, and the circumference of each of the three gear wheels overlaps the circumferences of the other two gear wheels.

FRITZ HUBER.